(12) United States Patent
Stroebel et al.

(10) Patent No.: US 7,543,774 B2
(45) Date of Patent: Jun. 9, 2009

(54) COILING MACHINE AND METHOD FOR THE PRODUCTION OF A COIL

(75) Inventors: Wolfgang Stroebel, Renningen (DE); Roland Kirschner, Wimsheim (DE)

(73) Assignee: Robert Bosch GmbH, Stuttgart (DE)

( * ) Notice: Subject to any disclaimer, the term of this patent is extended or adjusted under 35 U.S.C. 154(b) by 152 days.

(21) Appl. No.: 10/517,789

(22) PCT Filed: Oct. 6, 2003

(86) PCT No.: PCT/DE03/03324

§ 371 (c)(1), (2), (4) Date: Dec. 13, 2004

(87) PCT Pub. No.: WO2004/034554

PCT Pub. Date: Apr. 22, 2004

(65) Prior Publication Data

US 2005/0258296 A1    Nov. 24, 2005

(30) Foreign Application Priority Data

Oct. 4, 2002    (DE) .............................. 102 46 423

(51) Int. Cl.
*H02K 15/09*    (2006.01)
(52) U.S. Cl. ................... 242/433.4; 29/598; 29/605
(58) Field of Classification Search ... 242/433.2–433.4, 242/443, 445.1; 29/605, 606, 596, 598
See application file for complete search history.

(56) References Cited

U.S. PATENT DOCUMENTS

| | | | |
|---|---|---|---|
| 3,713,598 A * | 1/1973 | Bucholtz et al. | ......... 242/433.3 |
| 3,765,080 A | 10/1973 | Lauer | |
| 4,340,186 A * | 7/1982 | Shimada et al. | .......... 242/433.3 |
| 6,062,504 A * | 5/2000 | Luciani | .................... 242/433.4 |
| 6,386,243 B1 | 5/2002 | Bonnacorsi et al. | |
| 7,011,266 B2 * | 3/2006 | Hashimoto et al. | ....... 242/433.4 |
| 2002/0148526 A1 | 10/2002 | Bonnacorsi et al. | |

FOREIGN PATENT DOCUMENTS

| | | |
|---|---|---|
| DE | 35 18 651 A1 | 11/1986 |
| EP | 0 236 213 A1 | 9/1987 |
| JP | 56-148162 | 11/1981 |
| JP | 58182456 | 10/1983 |

OTHER PUBLICATIONS

Patent Abstracts of Japan,JP 61244007 Oct. 30, 1986.

* cited by examiner

*Primary Examiner*—Emmanuel M Marcelo
(74) *Attorney, Agent, or Firm*—Michael J. Striker (57) ABSTRACT

A winding machine (20) has a carrier device (23) for winding a winding for an electrical machine. The carrier device (23) has at least one group (34) having a winding template (29) and an adjacent deflection element (31), and the winding template (29) and the adjacent deflection element (31) are displaceable relative to one another. In a method for producing a winding from at least one coil, at least one wire is wound around a winding template (29), producing at least one wire arrangement with at least one first coil side (68), at least one first deflection side (69), and at least one second coil (70), and a winding template (29) is displaced out of a plane for the winding process.

18 Claims, 6 Drawing Sheets

COILING MACHINE AND METHOD FOR THE PRODUCTION OF A COIL

CROSS-REFERENCE

The invention described and claimed hereinbelow is also described in PCT/DE 03/03324, filed on Oct. 6, 2003 and DE 102 46 423.5, filed Oct. 4, 2002. This German Patent Application, whose subject mailer is incorporated here by reference, provides the basis for a claim of priority of invention under 35 U.S.C. 119(a)-(d).

BACKGROUND OF THE INVENTION

The invention relates to a winding machine and to a method for producing a winding.

In known winding machines, a wire is wound in more or less many loops around a winding carrier or a coil. After the predetermined number of windings, the winding wire is capped; the single coil is removed and typically mounted on a stator tooth intended for it. Once this has been done for a multi-pole stator, for instance, such as one with 36 single coils, a total of 72 wire ends of the individual coils have to be interconnected in the desired manner. Thus not only is the effort for producing the single coils great, but the effort for producing the desired interconnection of the stator winding is disproportionately great.

SUMMARY OF THE INVENTION

A winding machine with a carrier device for winding a winding for an electrical machine is provided, and this winding machine has at least one group comprising a winding template and an adjacent deflection element, and the winding template and the adjacent deflection element are displaceable relative to one another, have the advantage that as a result, each individual winding template is freely accessible for being wound, making industrially suitable production of an integrally embodied winding with a plurality of loops possible. With the provisions recited in the dependent claims, advantageous refinements of the winding machine of the first independent claim are possible.

If a row of groups is followed by a final winding template, a coil or winding becomes possible which has both a first and a last coil or winding on its respective ends. Since typically a partial voltage of the same magnitude is generated in each coil, the beginning and the end of the wire for one entire phase winding are therefore both located on the same side. The effort and expense for wiring the individual phases, for instance in a delta circuit or Y circuit, even with a rectifier, is only slight.

In a further embodiment, it is provided that the carrier device is rotatable about a pivot axis. This rotatability makes an especially effective winding of one complete phase possible, since the energy input is less, compared with an alternative arrangement. An alternative arrangement would comprise the rotatability of the wire store and wire delivery. However, the latter would have to rotate about a markedly longer radius, so that the load on these components would be markedly greater. The energy input would furthermore be increased as a result.

If the pivot axis of the winding machine is displaceable relative to the carrier device, then the winding template can adjust in such a way that the pivot axis is located inside the winding template around which the winding is to be done. This makes economical winding of the individual windings or coils about the respective winding template possible with a virtually uniform wire delivery speed, both in the wire delivery or wire guidance, and at the winding cheek itself.

It is also provided that the winding template has an edge on one free end. If initially a relatively simple prismatic shape of winding template is assumed, this edge represents an excess length. Once this prismatic body of the winding template has been wound and such a winding template has been displaced in its axial position, then because of the relationships of the wire to other winding templates or deflection elements, the result could be that the wire slips downward from the winding template that is to be displaced. This must absolutely be avoided if a correct winding operation is to be achieved.

For producing an electrical machine, it is desirable for the stator and its winding, or the winding heads thereof, to have as uniform a construction as possible, to avoid asymmetries and hence to keep differences in cooling and flow as slight as possible. This also involves flow noises, which are equally unwanted. For this reason, it is provided that in the winding of the wire about a winding template, a regularly ordered construction of a single coil is already attained early. For this purpose, at least one separator element is provided on the cheek sides of the winding template, so that when a multiple wire is wound, the at least two wires finally come to rest on one another. Other reasons for such separator elements are for instance when rectangular wires are used, that is, wires whose cross section is approximately a rectangle and whose winding or bending around the cheek sides is done with the greatest possible bending resistance, in order absolutely to avoid unwanted shifting of the deflection sides of a wire segment. Such deflection or tipping over of such a deflection wire would cause the winding heads to have an undesirably great radial structure relative to their position in an electrical machine.

In a further embodiment of the winding machine, it is provided that the winding machine has at least two stepped rests, each for at least one wire, for graduating the coil width within a coil. The coil width is considered here to be the length of a coil in the direction of the later axial direction of the electrical machine. As a result of the stepped rest, at least two wire segments are attained which because of their axial length are located in different positions and can be accommodated in a space-saving way in the winding head. This keeps a winding head small in its radial length.

It should be possible for the finished wound winding to be removed from the winding templates as simply as possible, and thus without overly great mechanical resistance. To that end, it is provided that the at least one winding template comprises at least two winding cheeks that are adjustable relative to one another. For instance, a free edge on the end of a winding template or separator elements are adjustable such that it presents no obstacle to the removal of the winding from the or the winding template.

Either both winding cheeks may be adjustable relative to one another, or only one may be adjustable. For the winding operation, it is desirable for the winding operation to proceed without vibration problems of varying nature, so that the at least one wire can be delivered via a wire guide which avoids such vibration problems.

To reinforce the winding operation and in particular the ordered arrangement of the individual loops on a winding cheek, it is provided that the wire guide is adjustable in accordance with a winding progress relative to a winding cheek. This adjustment includes both an adjustment of the wire guide relative to a nonadjustable carrier element and an adjustment of the carrier element relative to the nonadjustable wire guide.

In a coordinate claim, a method for producing a winding from at least one coil is provided, in which at least one wire can be wound about a winding template, resulting in at least one wire arrangement with at least one first coil side, at least one first deflection side, and at least one second coil side, and a winding template is displaced out of a plane for the winding process. By this method, on the one hand a single winding template becomes accessible all the way around, and on the other, a winding that has a plurality of coils can be produced by means of a tool.

By the provisions recited in the following dependent claims, advantageous refinements of the method for producing a winding in accordance with the coordinate claim are possible. For instance, after the coil has been wound, the winding template with the coil is pushed back into the plane, so that following winding templates can be freely wound. For integrally connecting the individual coils, it is provided that the after the first coil is wound, at least one wire is wound about an adjacent deflection element in a second direction of rotation, to produce a coil connector.

DETAILED DESCRIPTION OF THE PREFERRED EMBODIMENTS

Figure 1:
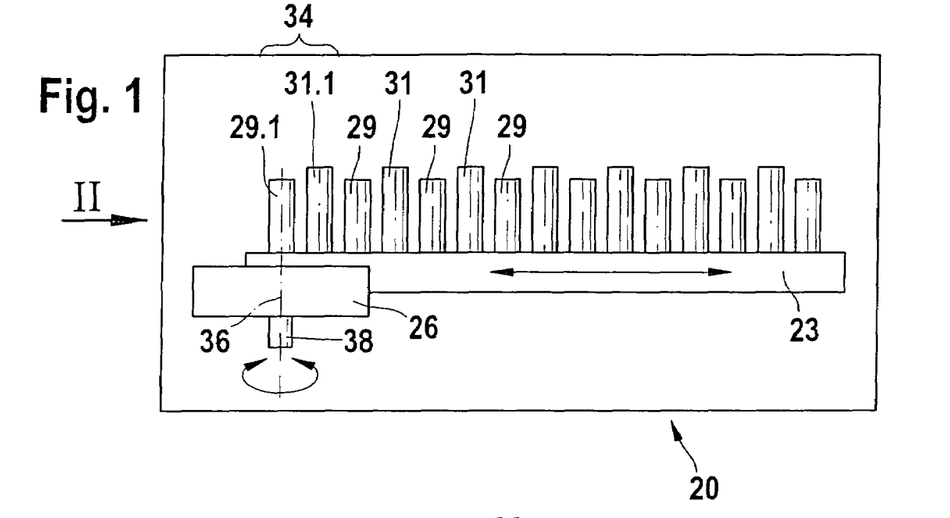
FIG. 1, a winding machine with a carrier device.

In FIG. 1, a winding machine 20 with a carrier device 23 is shown, for winding a winding for an electrical machine. The carrier device 23 is displaceably secured in a holder 26. Both winding templates 29 and deflection elements 31 are secured to the carrier device 23. A first winding template 29.1 and a first adjacent deflection element 31.1 form a first group 34, which is the minimum necessary for the function of the machine. In principle, the number of groups 34 is unlimited. The winding template 29.1 and the adjacent deflection element 31.1 are displaceable relative to one another, as will be explained in further detail for subsequent drawings. Each winding template 29 is displaceable relative to a deflection element 31. The carrier device 23 is rotatable about a pivot axis 36. To that end, the holder 26 is driven via a shaft 28 and thus carries the carrier device 23 along with it.

The pivot axis 36 is displaceable relative to the carrier device 23. In this concrete exemplary embodiment, this means that the carrier device 23 is displaceable in the holder 26, so that the intrinsically fixed pivot axis 36 is displaced relative to the carrier device. In the view shown, the pivot axis 36 is inside the first winding template 29.1.

Figure 2:
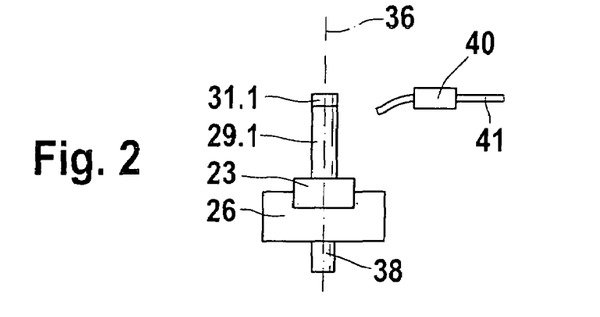
FIG. 2, an end-on view of the winding machine of FIG. 1.

In FIG. 2, the winding machine 20 described in conjunction with FIG. 1 is shown in an end-on view as in FIG. 1. Via a wire guide 40, at least one wire 41 can be delivered to the winding machine 20.

Figure 3:
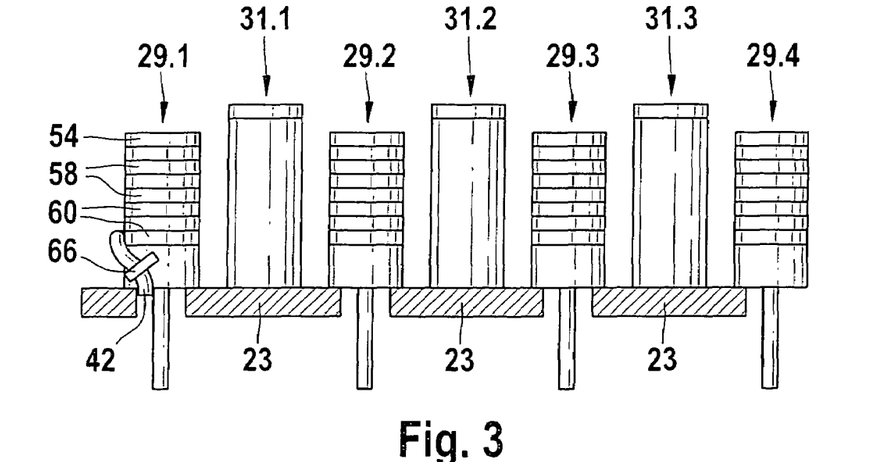
FIG. 3, a carrier device of the winding machine, in an initial position in a side view.

FIG. 3, in a schematic view, shows an arrangement of three groups 34, each having one winding template 29 and one deflection element 31. The groups, three of them in this example, form one row, which is followed by a final winding template 29.4. The winding template 29 and the deflection elements 31 are seated on the carrier device 23, which is shown in section here.

Before the function and mode of operation of the winding machine 20 is described further, the functions of the winding templates 29 will be explained in various exemplary embodiments.

Figure 4A:
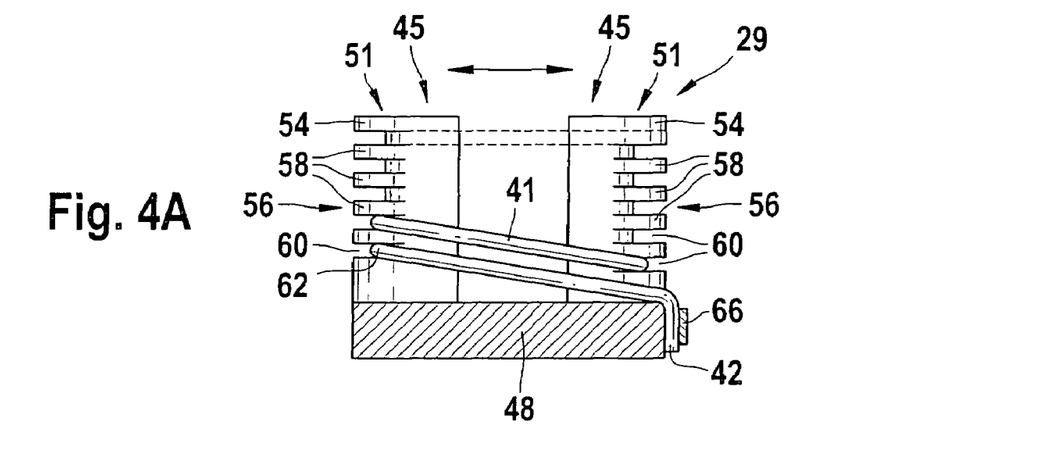
FIGS. 4A, 4B and 4C, various exemplary embodiments of a winding template 29.
Figure 15:
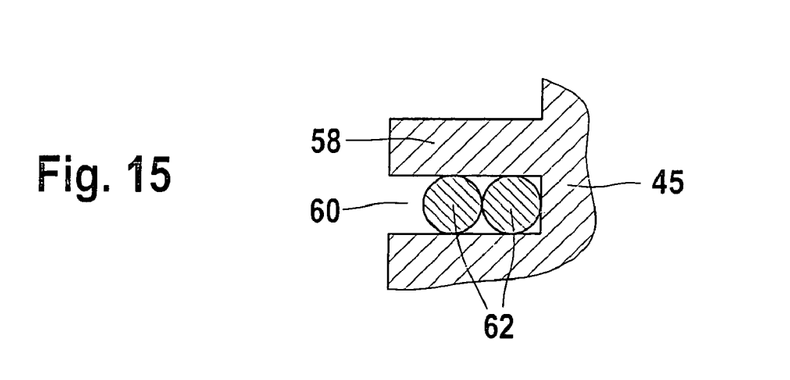
FIG. 15, a fragmentary view of a winding template with a double wire.

In FIG. 4A, a first exemplary embodiment of a winding template 29 is shown. The winding template 29 comprises two winding cheeks 45, which are seated on a cheek holder 48 to which one wire end 42 (the beginning of the wire) is secured. This exemplary embodiment of the winding template 29, or in other words the winding cheeks 45 shown there, have an edge 54 on one free end 51. The function of this edge will be explained later. In addition, the winding cheeks 45 and thus the winding template 29, on their cheek sides 56, have at least one separator element 58. The separator elements serve to enable winding the wire or wires 41 at defined positions, for instance in order to prevent twisting of rectangular wires around themselves or in the wire direction, or in the case of a double round wire, that is, when two round wires are wound simultaneously, to enable avoiding an offset relative to one another; see also FIG. 15. Once a wire 41 has been wound around a winding template 29 of this kind, the individual wire windings 62 are located in slots 60 disposed between the separator elements 58. In order finally to be able to remove the individual wire windings or completely wound coils from the individual winding templates 29, it is necessary that the winding cheeks 25 be moved relative to one another. In this case, this means that the winding cheeks 45 must be moved toward one another. The separator elements 58 are so short, or the slots 60 are so shallow, that by simply pushing the winding cheeks 45 toward one another—as indicated by the double arrow—the wire windings 62 emerge from the slots 60 and finally leave them. The wire windings 62 have such high intrinsic stability that they hardly change position at all, except for the known elastic component. Once the winding cheeks 45 have been pushed together and the wire end 42 has been released, a winding can be removed from its winding template 29.

Figure 4B:
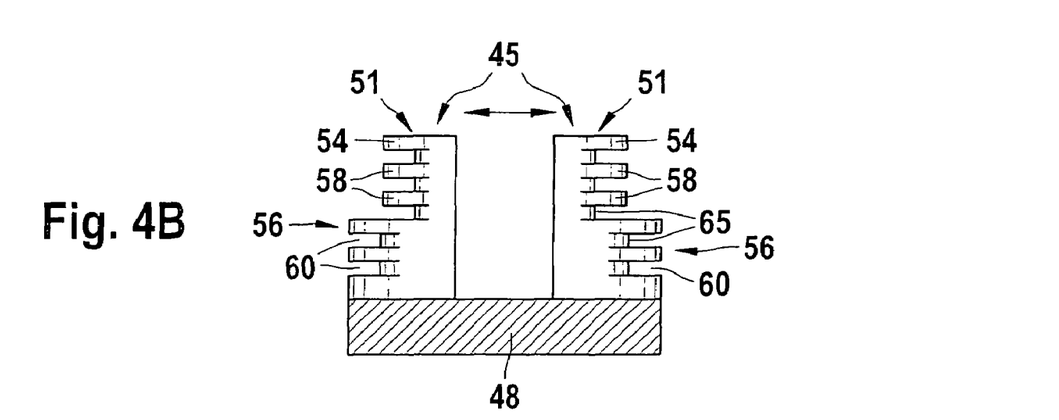

In FIG. 4B, a further exemplary embodiment of a winding template 29 is shown, which takes the example shown in FIG. 4A as its point of departure. Once again, the winding cheeks 45 described above are present, which are seated on the cheek holder 48. There is one edge 54 on each of the free ends 51. On the cheek sides 56, the separator elements 58 and slots 60 described above are also present. In a distinction from the exemplary embodiment of FIG. 4A, however, the winding template 29 has at least two stepped rests, each for at least one wire 41, to enable stepping down a coil width within one coil. These at least two stepped rests are each formed by one slot base 65. If a wire 41 is wound around such a winding template 29, or such winding cheeks 45, then it can be seen that the coil width overall is variable. Specifically, there is a lower region with a relatively wide coil width, but above it, later, there is a winding portion or coil portion with a reduced coil width, which is due to the fact that the wire is wound over the different rests.

Figure 4C:
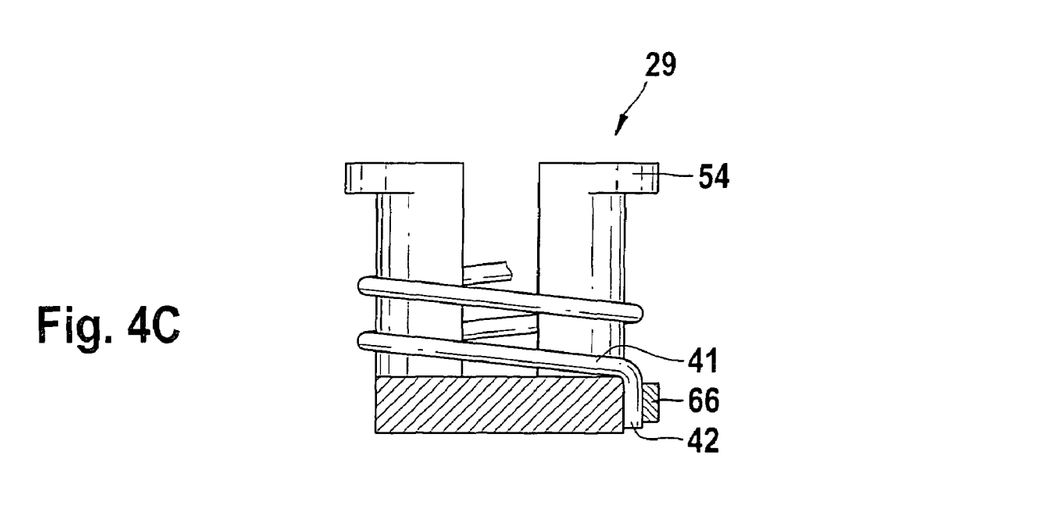

In FIG. 4C, a somewhat simpler exemplary embodiment of a winding template 29 is shown. Once again, this winding template comprises two winding cheeks 45, which each have one edge 54 on their free end 51. In this case, the wire is wound around the winding template 29 without separator elements 58 and slots 60. This can easily be done using simple round wire 41, without making further demands in terms of the design of the winding. However, since here as well a change in position of the winding template 29 relative to an adjacent deflection element 31 is intended, the edge 54 is required here as well, to prevent the winding from slipping unintentionally down from the winding template 29.

Figure 5:
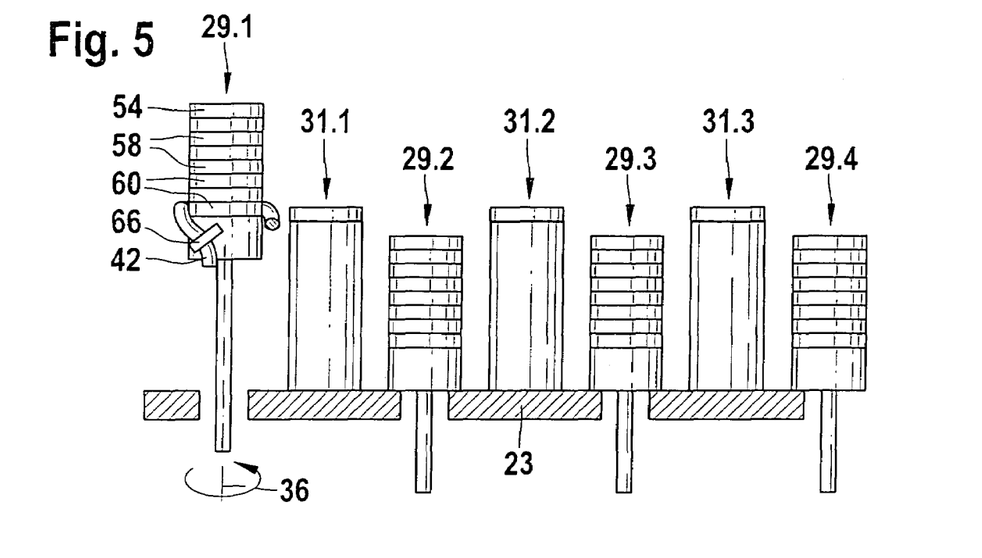
FIG. 5, the carrier device in the first working position, in a side view.

The method for producing a winding from at least one coil will now be described. In this connection, further details of the machine will be explained. After the fixation of a wire end 42 to the first winding template 29.1 using a fastening element 66 (see also FIG. 3), the winding template 29.1 is lifted or displaced out of a common plane shared with the further winding templates 29 and the deflection elements 31; see also FIG. 5. The first winding template 29.1 is then in the position of the pivot axis 36. The winding template 29.1 is displaced so far out of the plane that the lowermost slot 60 is above the remaining deflection elements 31 and winding templates 29.

Figure 7:
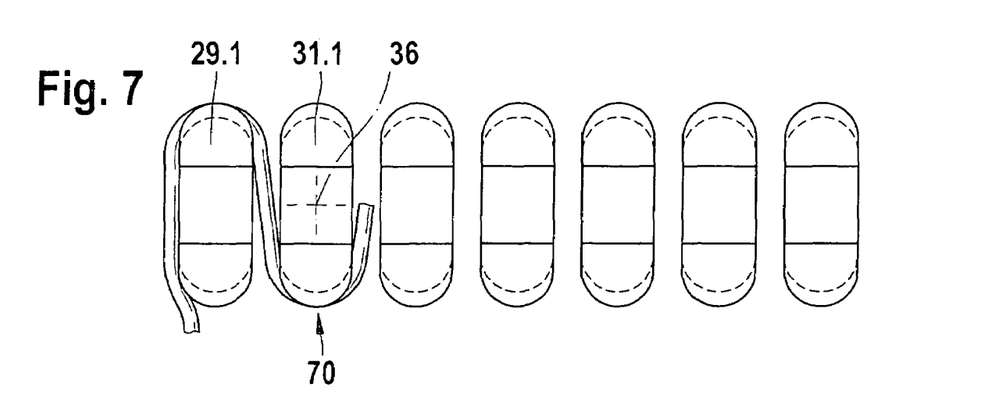
FIG. 7, the carrier device in the first deflected position, in a plan view.
Figure 8:
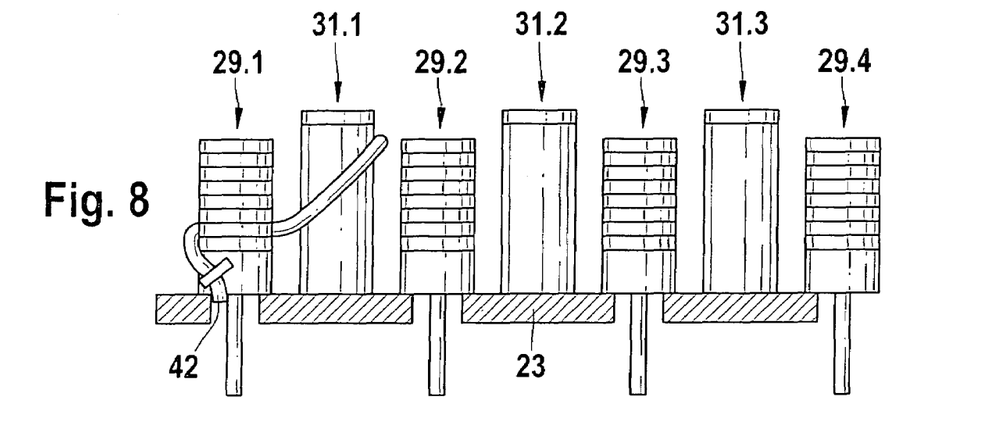
FIG. 8, the carrier device after the winding of a first deflection element, in a side view, before a second coil is wound.

After this displacement of the winding template 29.1, the entire carrier device 23, already described in conjunction with FIG. 1, is rotated with the holder 26, by means of the shaft 38, about the axis 36, but the wire guide 40 is at least not rotated. As a result of this rotation of the entire carrier device 23 and thus also of the first winding template 29.1, the wire is wound around the first winding template 29.1, resulting in at least one wire arrangement with at least one first coil side 68, at least one first deflection 69, and at least one second coil side 68; see also FIG. 6. The winding around the first winding template 29 or 29.1 is done in a first direction of rotation in order to produce a first coil. In a further step, a first coil connector 70 is wound around the deflection element 31.1. To that end, the second coil side 68, or an extension of it in the direction of the wire guide 40, is wound by opposite rotation in a second direction of rotation, opposite the first, around the deflection element 31.1; see also FIG. 7. To that end, the pivot axis 36 is adjusted to the deflection element 31.1, by displacement of the carrier device 23 in the holder 26. For winding the second coil around the second winding template 29.2, the first winding template 29.1 is pushed back into the plane again; see also FIG. 8.

Figure 9:
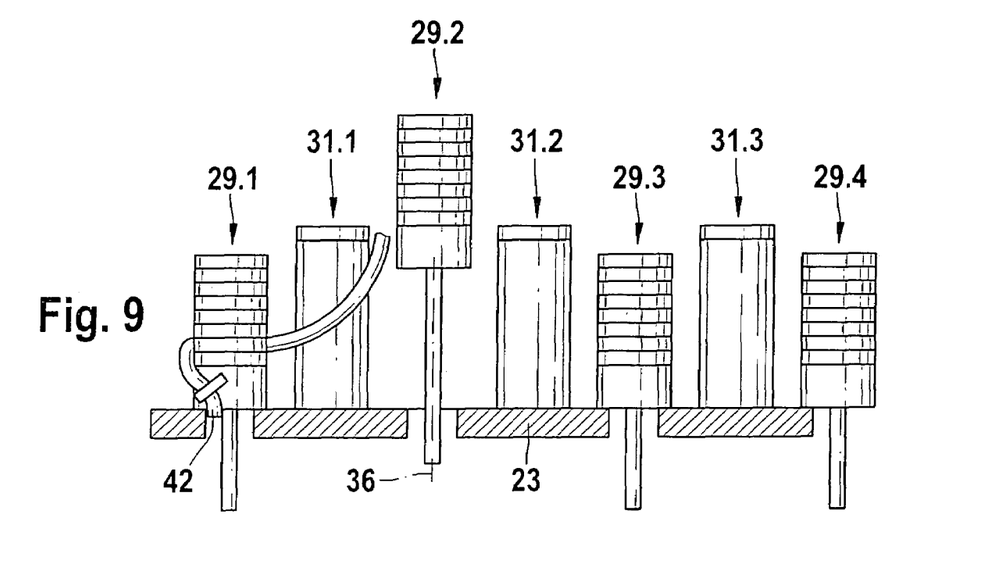
FIG. 9, the carrier device in a second working position, that is, in the position in which the second coil is wound.
Figure 10:
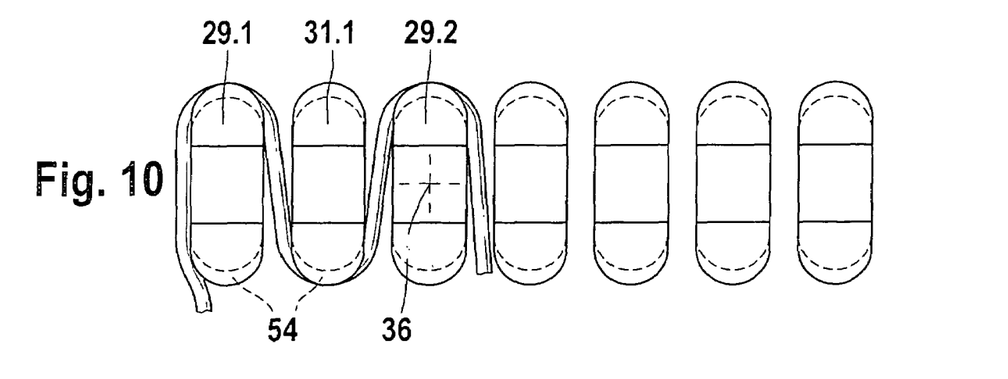
FIG. 10, the carrier device in the second working position, in a plan view.
Figure 11:
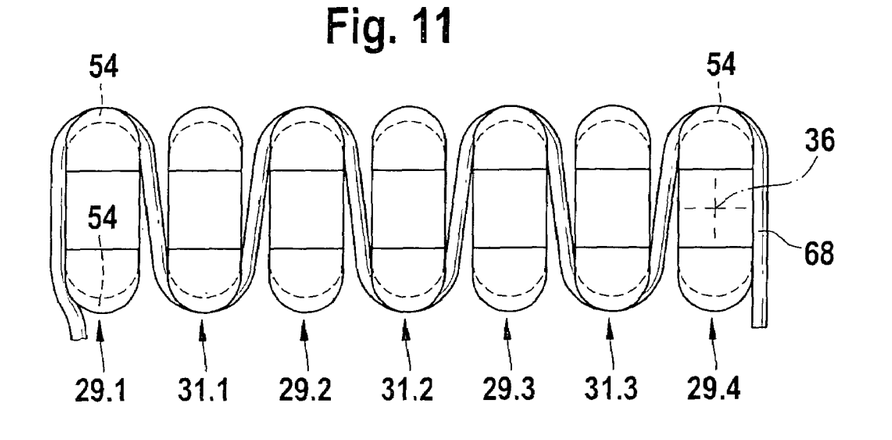
FIG. 11, the carrier device after one complete, single wave winding has been wound, in a plan view.

In a further work step, the second winding template 29.2—as has already been done for the first winding template 29.1—is displaced out of the plane, so that the winding can also be done freely around this winding template 29; see also FIG. 9. A second coil is wound around the second winding template 29.2, so that once again a first coil side 68, a first deflection side 69, and at least one second coil side 68 are located around, or have been wound around, the winding template 29.2. This winding operation around the second winding template likewise takes place in a first direction of rotation, and once again the pivot axis 36 is adjusted to the second winding template 29.2; see also FIG. 10. Winding of the winding template 29 and deflection elements 31 is also done analogously until the final winding template 29.4; see also FIG. 11. If a single wave winding of this kind is wanted, for instance for a stator of an electrical machine, then the winding shown in FIG. 11 is complete upon the winding of the second coil side 68, and the wire 41 can now be capped. After that, the winding can be removed from the winding templates 29 after the end of the winding operation. If the winding template 29 is equipped with an edge 54, as also shown in FIGS. 5 through 11, then the winding can intrinsically not be pulled downward from the winding templates and deflection elements 31 unless further provisions are made. As already indicated in conjunction with FIGS. 4A, 4B and 4C, because of the undercuts between the edges 54 and the wires 41, it is necessary for at least one second winding cheek 45 of a winding template 29 to be adjusted so that the winding can be removed. As a result of the adjustment of the winding cheeks 41, the winding cheeks are located entirely within one winding, so that undercuts are eliminated and removal is simple.

If instead of a wave winding as in FIG. 11, a double wave winding is used, then after the second coil side 68 about the winding template 29.4, the wire should not be capped but should continue to be wound, so that a third coil side 68 around the winding template 29.4 is produced. Analogously to the steps involved in the winding operation from the winding templates 29.1 to the winding template 29.4, the wire 41 should however be wound backward along the respective other side of the winding template 29 or deflection element 31.

Figure 6:
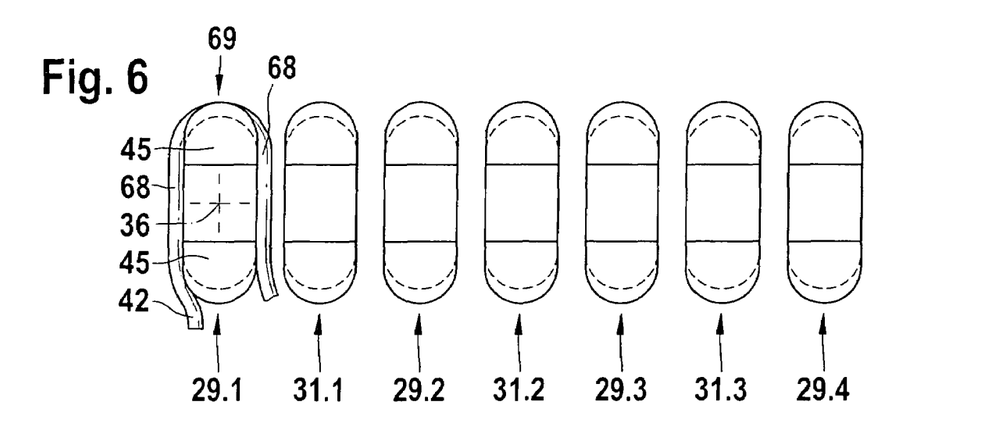
FIG. 6, the carrier device in the first working position, in a plan view.
Figure 12A:
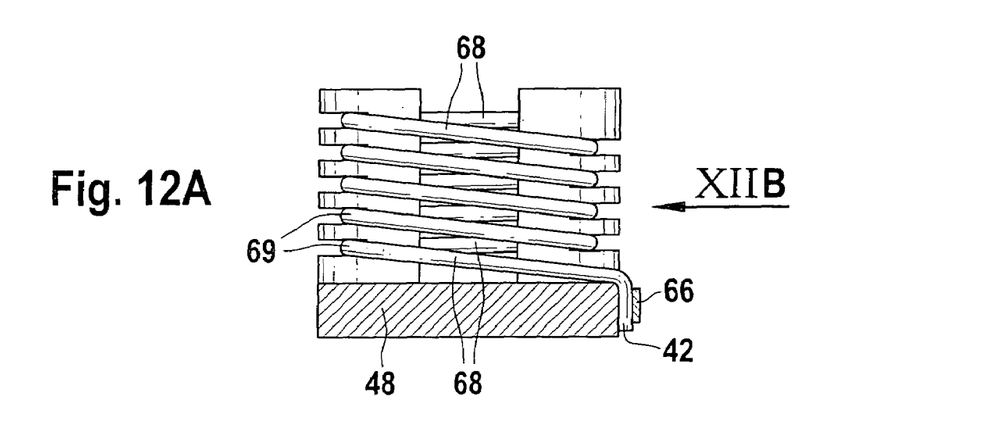
FIGS. 12A and 12B, a coil on a winding template, in two side views.
Figure 12B:
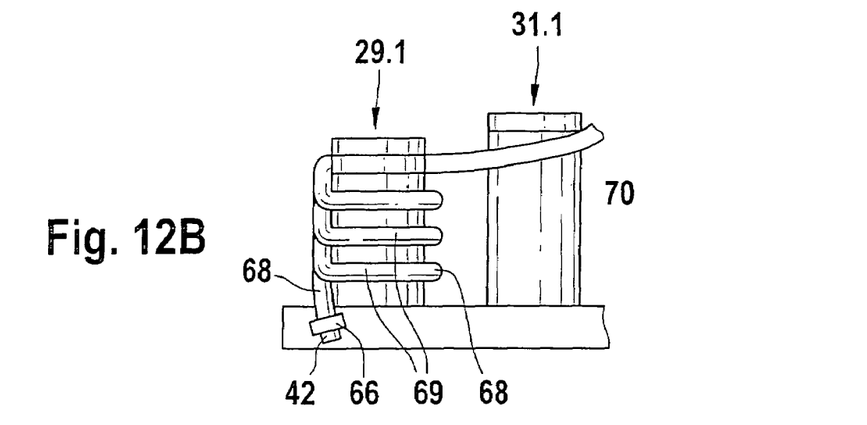

To produce a single loop winding, the sequences described can easily be modified. The first step, as shown in FIG. 6, of winding the wire around the first winding template 29.1 is the same, but after the second coil side 68 winding is not done in the same way around the deflection element 31 but instead, for instance with five windings, a single coil around the winding template 29.1 is produced; see also FIGS. 12A and 12B. Only after that is a coil connector 70 produced by means of the deflection element 31.1, as already described in conjunction with FIG. 6. To produce a complete, single coil winding, for this purpose windings are each wound in the desired number around a single winding template 29 until at the final winding template 29 or 29.4, a final second coil side 68 is wound, and then the wire is capped analogously to FIG. 11.

A single winding template 29 need not necessarily be pushed back into the plane in order to produce a coil connector 70. For instance if only a few windings are intended around one winding template 29, then the spacing from the top of a deflection element 31 is not excessive, and thus the wire between two coils does not become overly long, either. The larger or thicker a coil is around a winding template 29, however, the more necessary it becomes, before winding around a deflection element 31 is done, first to push the winding template 29 with the coil back into the plane. Also for removing a single loop winding with a plurality of windings about a winding template 29, it is necessary, for removing the winding from the winding machine, to adjust the winding cheeks 45.

Figure 13:
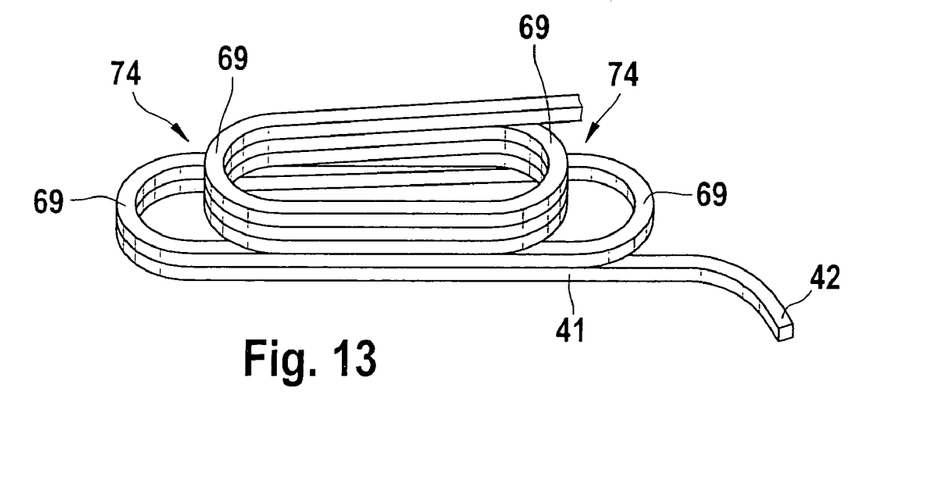
FIG. 13, a single coil with an offset winding head.
Figure 14:
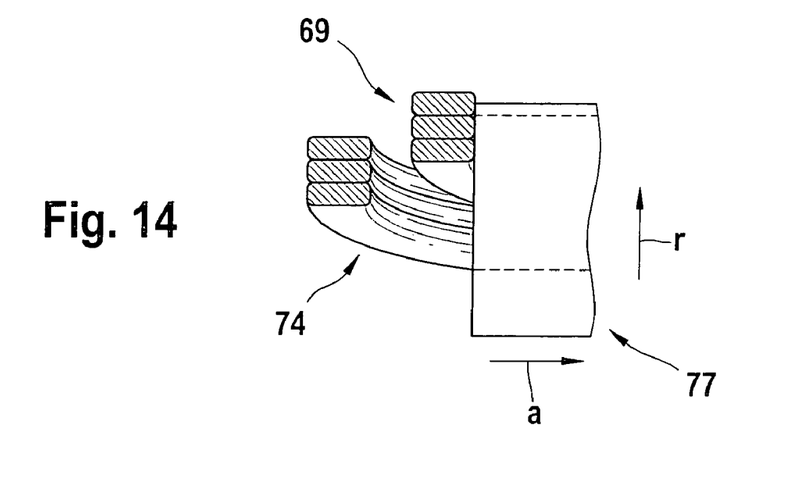
FIG. 14, a fragmentary view of a stator with a single coil, shown in section, with an offset winding head.

The winding template 29 shown in FIG. 4B, with the shoulders, leads to a coil with an offset winding head 74 each time; see also FIG. 13. This offset winding head has the advantage that the deflection sides 69 can assume various positions; see also FIG. 14. In FIG. 14, a stator 77 of an electrical machine is shown in fragmentary form. Because of the axial offset of the deflection sides 69, it is possible to reduce the radial length of the winding head referred to the pivot axis of a rotor of the electrical machine and instead to increase its length in the axial direction. In FIG. 13, the radial direction is identified by an arrow and the letter r, while the axial direction is identified by an arrow and the letter a. To reduce the radial length of the winding head, the axially outer deflection sides 69 are bent such that they are at least partly at the same radial height as the deflection sides 69 of the winding head that are located farther inward.

At the outset it was noted that the winding template 29 and the deflection elements 31 were adjacent. The word "adjacent" means here that each winding template 29 is followed by a deflection element 31, until the arrangement ends as needed with a final winding template 29. The deflection elements 31 and the winding templates 29 are arranged in a straight row, for reasons of practicability, although naturally other forms of rows, such as slightly curved ones, circular ones, or the like can be considered.

It is understood that the winding machine of the invention is suitable not only for processing profile wires 41, for instance of rectangular cross section, but also for winding conventional round wires 41; see also FIG. 4A. Moreover, because of winding cheeks 45 and separator elements 58, the winding machine is quite particularly suitable to be wound simultaneously with two round wires, or optionally even two rectangular wires. The separator elements 58 then bring about an unambiguous positional association of the individual wires and prevent them from slipping; see also FIG. 15.

It is also possible for each slot 60 to be wound multiple times with a simple wire.

When the individual winding template 29, lifted or displaced out of a plane, is being wound, the relative position between the wire guide 40 and the winding template 29 varies as a result of the winding. To avoid problems in wire delivery, for instance into the slots 60, it is provided that the wire guide 40 is adjustable in accordance with a winding progress relative to a winding cheek 45 or the winding template 29. As an alternative, it is possible to displace the entire carrier device 23 with the holder 26 axially and thus once again to bring about a relative adjustment between the wire guide 45 and the winding template 29.

In the same way as the winding templates 29 are constructed of two winding cheeks 45 that are displaceable relative to one another, the deflection elements 31 may also be constructed of two deflection cheeks displaceable relative to one another. This enables easy removal of the winding when wire of a particularly problematic shape is involved.

The invention claimed is:

1. A winding machine comprising, having a carrier device (23) for winding a winding for an electrical machine, having at least one group (34) comprising a winding template (29) and an adjacent deflection element (31), wherein:
   the winding template (29) and the adjacent deflection element (31) are secured to carrier device (23) and displaceable relative to one another and
   the carrier device (23) is rotatable about a pivot axis (36), wherein the winding template (29) and the adjacent deflection element (31) are rotatable about the pivot axis (36), and
   wherein the carrier device (23), with the winding template (29) and the adjacent deflection element (31) are displaceable transversely to the pivot axis (36).

2. The winding machine of claim 1, wherein one row of groups (34) is followed by a final winding template (29).

3. The winding machine of claim 1, wherein the carrier device (23) is rotatable about a pivot axis (36).

4. The winding machine of claim 1, wherein the pivot axis (36) is displaceable relative to the carrier device (23).

5. The winding machine of claim 1, wherein the winding template (29) has an edge (54) on one free end (51).

6. The winding machine of claim 1, wherein the winding template (29) has at least one separator element (58) on its cheek sides (56).

7. The winding machine of one of claim 1, wherein the at least one winding template (29) has at least two stepped rests, each for at least one wire, for graduating a coil width within a coil.

8. The winding machine of claim 1, wherein the winding template (29) comprises at least two winding cheeks (45) that are adjustable relative to one another.

9. The winding machine of claim 1, wherein via a wire guide (40), at least one wire can be delivered.

10. The winding machine of claim 9, wherein the wire guide (40) is adjustable in accordance with a progress in winding toward a winding cheek (45).

11. A method for producing a winding comprising at least one coil, wherein at least one wire is wound around a winding template (29), so that the result is at least one wire arrangement having at least one first coil side (68), at least one first deflection side (69), and at least one second coil side (68), and wherein for the winding process, a winding template (29) is displaced out of a plane,
   wherein the winding template (29) and the adjacent deflection element (31) are secured to a carrier device (23),
   wherein said of at least one coil is wound about said winding template in a first direction of rotation, while the carrier device (23) is rotated about a pivot axis (36), and
   wherein the winding template (29) is displaced out of a plane for free winding, and then in a further step the coil is wound in a second direction of rotation which is opposite to the first direction of rotation.

12. The method of claim 11, wherein a first winding template (29.1) is wound around in a first direction of rotation to produce a first coil.

13. The method of claim 11, wherein after the winding of the coil, the winding template (29) with the coil is pushed back into the plane.

14. The method of claim 11, wherein the at least one wire is then wound around an adjacent deflection element (31) in a second direction of rotation for producing a coil connector (70).

15. The method of claim 14, wherein then a further winding template (29) is displaced out of the plane for the winding process, a further coil having at least one first coil side (68), at least one first deflection side (69) and at least one second coil side (68), is wound in the first direction of rotation about this winding template (29), and then with the coil is pushed back with the coil into the plane.

16. The method of claim 14, wherein after the end of the winding operation, the winding is removed from the at least one winding template (29).

17. The method of claim 16, wherein at least one second winding cheek (45) of a winding template (29) is adjusted, so that the winding can be removed.

18. A winding for an electrical machine, characterized in that it is produced in accordance with claim 11.

* * * * *